(12) United States Patent
Koike et al.

(10) Patent No.: US 8,964,314 B2
(45) Date of Patent: Feb. 24, 2015

(54) LENS AND METHOD OF MOLDING LENS

(71) Applicant: FUJIFILM Corporation, Tokyo (JP)

(72) Inventors: Kazumi Koike, Saitama (JP); Seiichi Watanabe, Saitama (JP); Takayuki Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,786

(22) Filed: Mar. 28, 2014

(65) Prior Publication Data
US 2014/0240845 A1    Aug. 28, 2014

Related U.S. Application Data

(63) Continuation of application No. PCT/JP2012/074949, filed on Sep. 27, 2012.

(30) Foreign Application Priority Data

Sep. 30, 2011    (JP) .................. 2011-218536

(51) Int. Cl.
*G02B 7/02*    (2006.01)
*B29D 11/00*    (2006.01)
*G02B 13/00*    (2006.01)
*G02B 3/00*    (2006.01)
(Continued)

(52) U.S. Cl.
CPC .............. *G02B 13/0015* (2013.01); *G02B 3/00* (2013.01); *B29C 69/02* (2013.01); *B29D 11/00413* (2013.01); *H04M 1/0264* (2013.01); *B29L 2011/0016* (2013.01); *B29C 45/16* (2013.01); *B29C 43/021* (2013.01); *B29C 43/36* (2013.01)
USPC ........................................ 359/811; 264/1.32

(58) Field of Classification Search
CPC ...... B29C 43/021; B29C 45/16; B29C 43/00; B29C 43/14; B29C 2043/3618; C03B 11/08; C03B 2215/60; C03B 2215/79; G02B 3/0018; G02B 7/02; G02B 7/10; B29L 2011/0016; B29L 2012/00
USPC .......................................... 264/1.32; 359/811
See application file for complete search history.

(56) References Cited

U.S. PATENT DOCUMENTS

2006/0284327 A1    12/2006    Yamamichi

FOREIGN PATENT DOCUMENTS

| JP | 60-196317 | 10/1985 |
|----|-----------|---------|
| JP | 02-164729 | 6/1990 |
| JP | 03-248828 | 11/1991 |
| JP | 2007-022905 | 2/2007 |
| JP | 2008-230005 | 10/2008 |

OTHER PUBLICATIONS

Japanese Official Action—JP2013-536400—Apr. 22, 2014.
(Continued)

*Primary Examiner* — David N Spector
(74) *Attorney, Agent, or Firm* — Young & Thompson

(57) ABSTRACT

There are provided a lens that is molded with high accuracy and a method of molding the lens. The lens has an optical axis and includes a pair of optical functional surfaces on front and rear surfaces thereof. The lens includes an optical functional portion that includes the pair of optical functional surfaces, an edge portion that is provided at an outer periphery of the optical functional portion, and a connecting portion that is provided between the optical functional portion and the edge portion, connects the optical functional portion with the edge portion, and is thinner than the edge portion in a direction of the optical axis.

17 Claims, 14 Drawing Sheets

(51) Int. Cl.
  *B29C 69/02* (2006.01)
  *H04M 1/02* (2006.01)
  *B29L 11/00* (2006.01)
  *B29C 45/16* (2006.01)
  *B29C 43/02* (2006.01)
  *B29C 43/36* (2006.01)

(56) References Cited

OTHER PUBLICATIONS

International Search Report PCT/JP2012/074949 dated Oct. 23, 2012.
Written Opinion of the International Searching Authority (PCT/ISA/237) PCT/JP2012/074949 dated Oct. 23, 2012.

LENS AND METHOD OF MOLDING LENS

BACKGROUND OF THE INVENTION

1. Field of the Invention

The present invention relates to a lens and a method of molding the lens.

2. Description of the Related Art

A lens is used in an optical system of an imaging unit that is mounted on a mobile phone or a digital camera. The design of a small lens has proceeded with the downsizing and multi-functionalization of a mobile phone or the like.

Edge portions, which are mechanically supported by a holding frame and a lens barrel or maintain an interval between adjacent lenses in the direction of an optical axis when a lens is supported by the holding frame and the lens barrel and mounted on an imaging unit, are provided at the outer periphery of optical functional surfaces, which have a function of refracting light, of the lens. Further, the shape of an outer peripheral portion of the lens including these edge portions affects the eccentricity of the lens or the interval between the lenses in the direction of the optical axis. For this reason, not only the shape of the optical functional surface but also the edge portion that is provided at the outer peripheral portion of the optical functional surface is required to be accurately formed in the molding of the lens.

Here, injection molding in which molten resin is injected into a cavity partitioned in a mold so as to fill the cavity, and compression molding in which a resin is compressed by a mold and is molded in the shape of a molding surface formed in the mold are known as a method of manufacturing a resin lens.

In general, injection molding is a major method of molding the current resin lens, and is suitable for the continuous molding of multiple units. However, since the cavity is filled with molten resin, the resin does not smoothly flow when the lens is thin. For this reason, imperfect filling or the deterioration of the accuracy of a surface caused by the reduction of molding pressure may occur. Further, since molten resin flows in from a gate, strain caused by internal stress or the like is generated near the gate. As a result, the optical anisotropy (birefringence) of a lens may occur.

Meanwhile, compression molding is inferior to injection molding in terms of mass production, but can compensate for the shortcomings of injection molding. That is, since compression molding is a molding method in which a lump (preform) of a softened resin is squashed by a mold, the compression molding is not affected by the flow of a resin and is suitable for making a molded body thin as compared to injection molding. Further, optical anisotropy caused by the flow of a resin does not occur in compression molding unlike in injection molding. However, since a preform is squashed in compression molding, a portion, which absorbs an influence of variation in the volume of the preform, is required in compression molding. In the case of a lens, not only the accuracy of a surface but also the accuracy of a center thickness is an important parameter. As a result, since variation in the volume of the preform is absorbed by an external portion, it is difficult to improve the dimensional accuracy of an outer radial portion including the external portion.

There is a method disclosed in JP2007-22905A as a method of accurately forming the external shapes of an optical functional surface and a lens. JP2007-22905A discloses a molding method in which the compression molding of an optical element is performed by a mold and a frame body is bonded to the optical element with reference to the position of the mold while the optical element is held without opening the mold.

SUMMARY OF THE INVENTION

However, in the method disclosed in JP2007-22905A, a molded body subjected to compression molding and a molded body, which is bonded later in injection molding and forms the frame body, are bonded to each other with the thickness of a connecting portion. Accordingly, since it is difficult to secure the contact area of the boundary surface, separation or damage caused by the deterioration of adhesion is caused. In particular, since the flow of a resin becomes unsmooth and adhesion deteriorates as the thickness of the connecting portion is reduced, the reduction of the thickness of the lens is adversely affected.

The invention has been made in consideration of the above-mentioned circumstances, and is to provide a lens in which bonding between a molded body subjected to compression molding and a molded body subjected to injection molding is strengthened at a boundary surface, and a method of molding the lens.

(1) There is provided a lens that has an optical axis and includes a pair of optical functional surfaces on front and rear surfaces thereof. The lens includes an optical functional portion that includes the pair of optical functional surfaces, an edge portion that is provided at an outer periphery of the optical functional portion and includes protrusions for the support of a holding frame and a lens barrel and engagement with other adjacent lenses on the optical axis, and a connecting portion that is provided between the optical functional portion and the edge portion, connects the optical functional portion with the edge portion, and is thinner than the edge portion in a direction of the optical axis. The optical functional portion, the edge portion, and the connecting portion form a first molded portion that is formed by compression molding and includes the optical functional portion, the connecting portion, and a part of the edge portion, and a second molded portion that is formed by injection molding and forms the rest of the edge portion. The thickness of a boundary surface between the first and second molded portions in the direction of the optical axis is larger than the thickness of the thinnest portion of the connecting portion in the direction of the optical axis.

(2) There is provided a method of molding a lens, which includes a pair of optical functional surfaces on front and rear surfaces thereof, by a mold. The mold includes a first mold that includes a first transfer surface for transferring one of the pair of optical functional surfaces and a first outer peripheral transfer surface formed around the first transfer surface and a second mold that includes a second transfer surface for transferring the other of the pair of optical functional surfaces and a second outer peripheral transfer surface formed around the second transfer surface. The method includes a compression molding step of placing a compression molding material on the second transfer surface and forming the pair of optical functional surfaces on the compression molding material by compressing the compression molding material between the first and second transfer surfaces while closing the molds by moving the first and second molds relative to each other so that the first and second molds approach each other, and an injection molding step of forming outer peripheral portions of the pair of optical functional surfaces with an injection molding material by injecting the injection molding material into an outer peripheral transfer cavity partitioned between the first and second outer peripheral transfer surfaces when the molds are closed. The outer peripheral transfer cavity is filled with the injection molding material in the injection molding step when at least a part of the compression molding material is extruded into the outer peripheral transfer cavity by a compressive force.

According to the invention, since it is possible to make the area of a boundary surface between a compression molding material and an injection molding material large while taking advantage of compression molding and injection molding, adhesion is improved. Accordingly, it is possible to provide a lens in which separation or damage is prevented, and a method of molding the lens.

DESCRIPTION OF THE PREFERRED EMBODIMENTS

Figure 1:
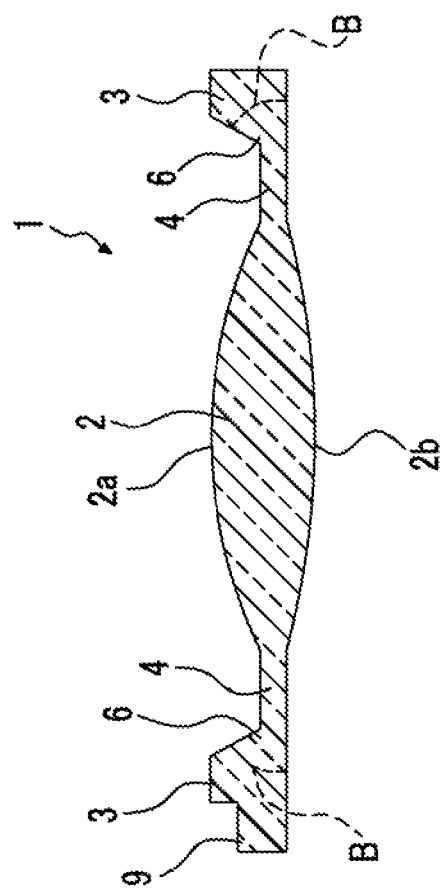
FIG. 1 is a cross-sectional view of a lens of the invention.

FIG. 1 shows a cross-section of a lens of the invention. The lens 1 includes an optical functional portion 2, a connecting portion 4 that is integrally formed at the outer periphery of the optical functional portion 2, and an edge portion 3 that is integrally formed at the outer periphery of the connecting portion 4.

The optical functional portion 2 includes a pair of optical functional surfaces 2a and 2b on the front and rear surfaces thereof. Both the optical functional surfaces 2a and 2b are convex surfaces.

The connecting portion 4 is formed to have a thickness that is smaller than the dimension of the optical functional portion 2 in the direction of an optical axis, that is, the thickness of the optical functional portion 2. The connecting portion 4 is an annular portion that is formed so as to surround the optical functional portion 2 when seen in the direction of the optical axis.

The edge portion 3 is formed to be thicker than the connecting portion 4. The edge portion 3 includes a portion of which the thickness is gradually increased toward the outer periphery of the lens 1 from the outer peripheral portion of the connecting portion 4. The edge portion 3 is an annular portion that is formed so as to surround the optical functional portion 2 and the connecting portion 4 when seen in the direction of the optical axis.

The edge portion 3 is a portion that is directly fitted to a mating member when the lens 1 is assembled with a support frame and a lens barrel.

A gate residue 9 is formed on a part of the outer peripheral surface of the edge portion 3 of the lens 1. A molding material, which remains at a gate portion through which the molding material is injected, remains on the lens 1 in an injection molding step to be described below, so that the gate residue 9 is formed. The gate residue 9 is cut after molding. FIG. 1 shows a state in which the gate residue 9 is not yet cut from the lens 1.

The lens 1 is formed by a molding method that includes a compression molding step and an injection molding step. For this reason, the lens 1 includes a first molded portion that is made of a compression molding material and a second molded portion that is made of an injection molding material. Meanwhile, the compression molding material and the injection molding material are collectively referred to as a molding material in the following description. Both of the compression molding material and the injection molding material are thermoplastic resins in the following description.

A boundary surface between the first and second molded portions is represented by a dotted line B in FIG. 1, and is described as a boundary surface B. The boundary surface B between the first and second molded portions of the lens 1 is included in the edge portion 3. Meanwhile, the boundary surface B between the first and second molded portions is changed according to the conditions of compression molding and injection molding, and the shape or position of the boundary surface B may be changed without departing from the range in which the effect of the invention is obtained.

The first molded portion includes the optical functional portion 2 and the pair of optical functional surfaces 2a and 2b of the optical functional portion 2, and the first molded portion is a portion that includes the connecting portion 4. The first molded portion includes a portion 6 that is formed at the outer peripheral portion of the connecting portion 4 so as to be thicker than the connecting portion 4 and spreads in the direction of the optical axis so as to be extruded to the edge portion 3. This portion 6 is referred to as an expansion portion 6. The expansion portion 6 forms a part of the edge portion.

The second molded portion corresponds to a portion of the lens 1 that is formed closer to the outer periphery than the boundary surface B, and is a portion that forms the rest of the edge portion 3.

Since the lens 1 is formed so that a thickness Bh1 of the expansion portion forming the boundary surface B between the first and second molded portions is larger than a thickness JT1 of the thinnest portion of the connecting portion of the first molded portion formed by compression molding (see FIG. 6), the surface area of the boundary surface B, which is a boundary surface between the first and second molded portions, becomes large. Accordingly, since the contact area between the first and second molded portions can be made large, the generation of defects, such as separation or damage of the boundary surface B, is suppressed.

Next, a mold for molding the lens 1 shown in FIG. 1 will be described. The following description appropriately refers to the structure of the lens 1 shown in FIG. 1.

Figure 2:
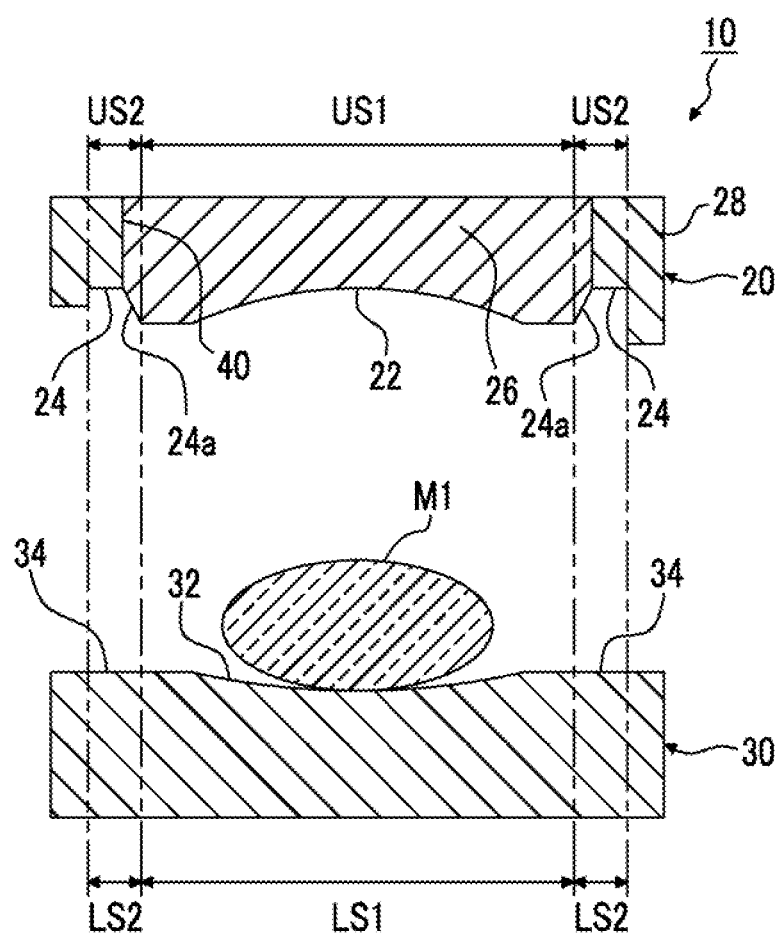
FIG. 2 is a schematic cross-sectional view of a mold for molding the lens of FIG. 1.

FIG. 2 shows the schematic cross-section of a mold for molding the lens of FIG. 1. A mold 10 includes an upper mold 20 that is a first mold and a lower mold 30 that is a second mold. Hereinafter, the first mold and the second mold are referred to as the upper mold 20 and the lower mold 30, respectively. FIG. 2 shows a state in which a compression molding material M1 is placed on the lower mold 30.

The upper mold 20 includes a columnar core part 26 and a substantially cylindrical body part 28 into which the core part 26 is relatively movably inserted and which is relatively movably fitted to the core part 26. During molding, the core part 26 and the body part 28 of the upper mold 20 are fixed to each other and cannot be moved relative to each other.

A transfer surface, which transfers a predetermined lens shape to the molding material, is formed on the lower end face of the upper mold 20. Further, a transfer surface, which transfers a predetermined lens shape to the molding material, is formed on an end face of the lower mold 30 facing the upper mold.

The transfer surface of the upper mold 20 includes a first transfer surface 22 that corresponds to the surface of a range indicated by an arrow US1, and a first outer peripheral transfer surface 24 that corresponds to the surface of a range indicated by an arrow US2. Likewise, the transfer surface of the lower mold 30 includes a second transfer surface 32 that corresponds to the surface of a range indicated by an arrow LS1, and a second outer peripheral transfer surface 34 that corresponds to the surface of a range indicated by an arrow LS2.

The first transfer surface 22 of the upper mold 20 includes a concave surface, and the concave surface has an inverted shape of the shape of the optical functional surface 2a of the lens 1. A flat surface, which transfers the shape of the connecting portion 4, is formed at the outer periphery of the concave surface of the first transfer surface 22. The flat surface is substantially perpendicular to the optical axis of the lens 1 to be molded.

The first outer peripheral transfer surface 24 includes an inclined surface 24a that continues to the first transfer surface 22. The first outer peripheral transfer surface 24 has an inverted shape of the shape of the edge portion 3 of the lens 1. In a plan view of the transfer surface of the upper mold 20, the first transfer surface 22 has a substantially perfect circular shape and the first outer peripheral transfer surface 24 and the inclined surface 24a are formed in an annular shape so as to surround the first transfer surface 22.

The second transfer surface 32 of the lower mold 30 includes a concave surface, and the concave surface has an inverted shape of the shape of the optical functional surface 2b of the lens 1. A flat surface, which transfers the shape of the connecting portion 4, is formed at the outer periphery of the concave surface of the second transfer surface 32.

The second outer peripheral transfer surface 34 is a flat surface that continues to the flat surface of the second transfer surface 32. The flat surfaces of the second transfer surface 32 and the second outer peripheral transfer surface 34 are substantially perpendicular to the direction of the optical axis of the lens 1 to be molded.

Next, a method of molding the lens will be described. A procedure for molding the lens 1, which is shown in FIG. 1, by using the mold shown in FIG. 2 will be described below.

In the molding of the lens 1, a compression molding step is performed first and an injection molding step is then performed. Prior to the compression molding step, the compression molding material M1 is placed on the second transfer surface 32 of the lower mold 30 as shown in FIG. 2. Here, the compression molding material M1 is a preform of a resin.

FIG. 3 illustrates a state of the compression molding of the lens using the mold of FIG. 2.

Figure 3A:
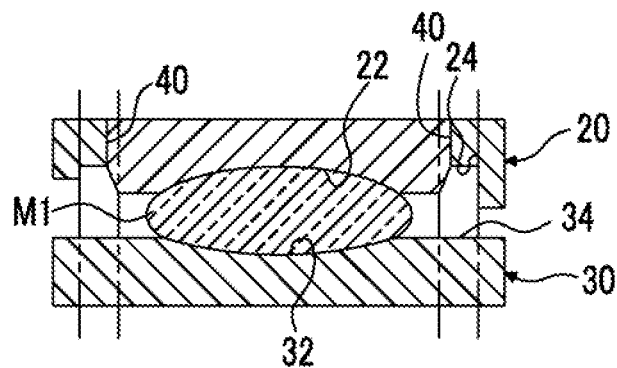
FIG. 3A, FIG. 3B, and FIG. 3C are cross-sectional views illustrating the compression molding of the lens in a molding procedure using the mold of FIG. 2.

In the compression molding step, first, the lower and upper molds 30 and 20 are moved relative to each other so as to approach each other as shown in FIG. 3A. Further, the compression molding material M1 is compressed between the first and second transfer surfaces 22 and 32. The shapes of the pair of optical functional surfaces 2a and 2b are transferred to the compression molding material M1.

Figure 3B:
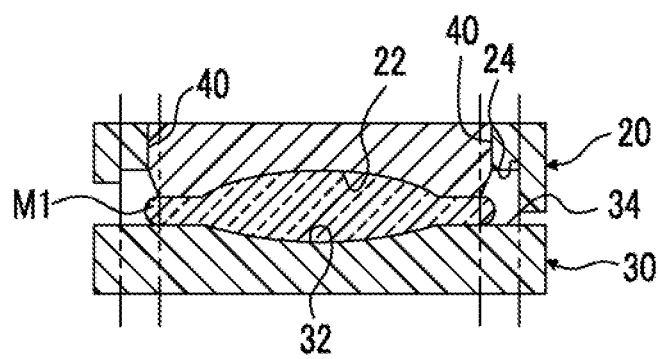

When the lower and upper molds 30 and 20 further approach each other as shown in FIG. 3B, the compression molding material M1 is pushed and expanded and a part of the compression molding material M1 expands toward an outer peripheral transfer cavity that is partitioned between the first and second outer peripheral transfer surfaces 24 and 34.

Figure 3C:
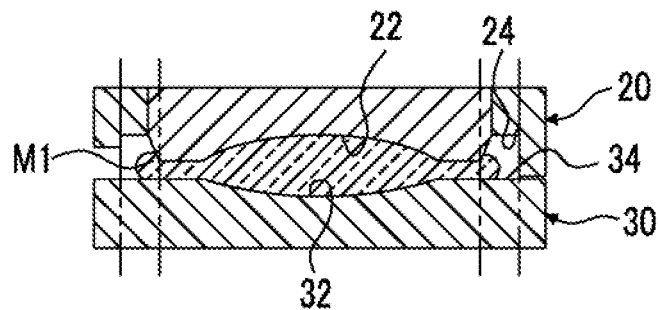

Further, when the lower and upper molds 30 and 20 further approach each other in a direction where the molds are closed as shown in FIG. 3C, a portion of the compression molding material M1, which is extruded into the outer peripheral transfer cavity partitioned between the first and second outer peripheral transfer surfaces 24 and 34, is released from compression pressure. Accordingly, the extruded portion of the compression molding material expands in the outer peripheral transfer cavity, and remains so that the thickness of the extruded portion is not changed between the first and second transfer surfaces 22 and 32 even though the lower and upper molds approach each other in a direction in which the mold is closed. Meanwhile, the thickness of the connecting portion in the direction of the optical axis is reduced by an operation for closing the mold. As a result, the thickness of the portion, which is extruded into the outer peripheral transfer cavity, in the direction of the optical axis becomes larger than the thickness of the connecting portion in the direction of the optical axis. The portion, which is extruded into the outer peripheral transfer cavity partitioned between the first and second outer peripheral transfer surfaces 24 and 34, corresponds to a portion that forms the expansion portion 6 of the lens 1 to be molded. Meanwhile, the shape of the expansion portion 6 is changed according to the amount of compression, compression speed, and the volume of the compression molding material M1 to be supplied in the compression molding step.

The lower and upper molds 30 and 20 are closed in this way, so that the compression molding step is completed.

Subsequently, the injection molding step is performed.

FIG. 4 illustrates the injection molding of the lens.

Figure 4A:
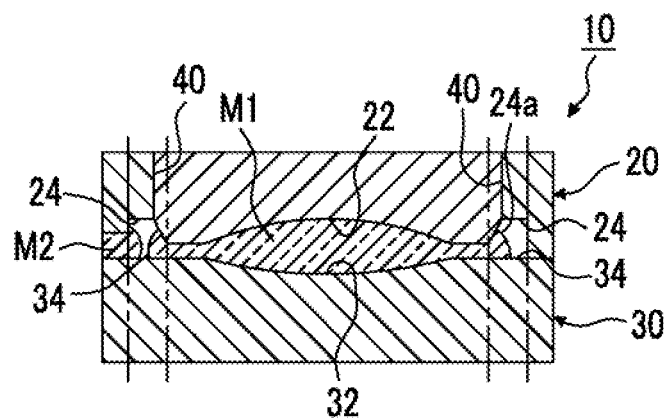
FIG. 4A and FIG. 4B are cross-sectional views illustrating the injection molding of the lens in the molding procedure using the mold of FIG. 2.

As shown in FIG. 4A, the injection molding step is performed in a state in which the lower and upper molds 30 and 20 are closed. An injection molding material M2 is injected into the outer peripheral transfer cavity, which is partitioned between the first and second outer peripheral transfer surfaces 24 and 34, from an injection gate of the mold 10. The outer peripheral transfer cavity is formed in an annular shape so as to surround the outer periphery of the compressed compression molding material M1.

The injection molding material M2 is injected into the outer peripheral transfer cavity of the mold after the molds are closed in the compression molding step. At this time, if the injection molding material M2 is injected before the compression molding material M1 reaches temperature equal to or lower than glass transition temperature, a compression molded portion and an injection molded portion can be more firmly bonded to each other at a boundary surface therebetween.

Further, preferably, adhesion at the boundary surface is more improved in the case of a combination having better compatibility of the compression molding material M1 and the injection molding material M2.

Figure 4B:
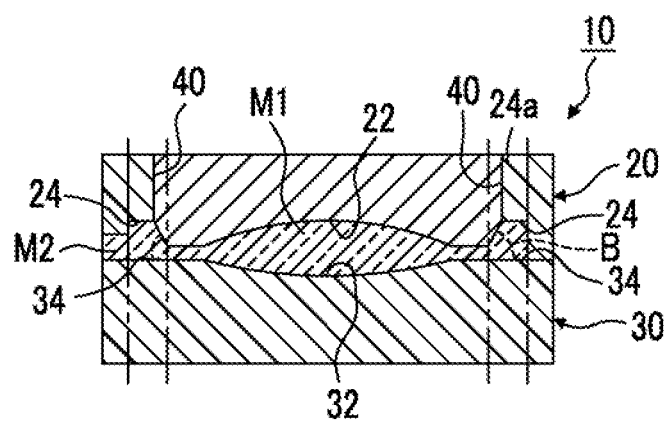

As shown in FIG. 4B, the injected injection molding material M2 is spread to the outer periphery of the compression molding material M1 through the outer peripheral transfer cavity, and is bonded to the compression molding material M1.

As the injection molding material M2 is injected, gas, such as air present in the outer peripheral transfer cavity or gas generated from the resin, is discharged to the outside of the mold through a mold parting groove 40 that is formed at the boundary between the first transfer surface 22 and the inclined surface 24a continuing to the first transfer surface 22. Further, since the outer peripheral portion of the compression molded portion is extruded into the outer peripheral transfer cavity, the confinement of gas near the boundary surface between the first and second molded portions is prevented.

After the injection molding, cooling is performed while the molds of the mold 10 are closed so that the compression molding material M1 and the injection molding material M2 are sufficiently hardened.

Figure 5:
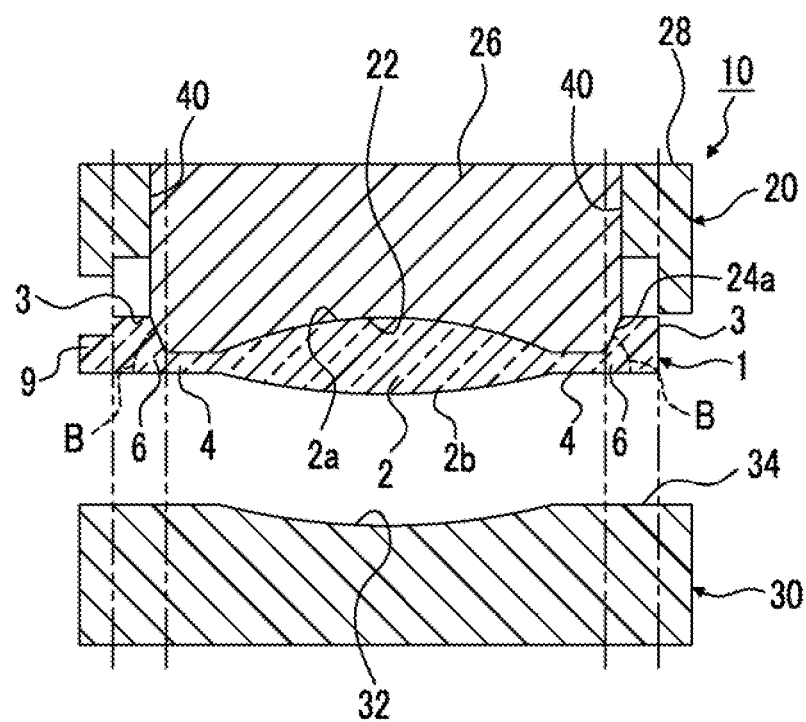
FIG. 5 is a cross-sectional view showing the release of the lens in the molding procedure using the mold of FIG. 2.

FIG. 5 shows the release of the lens.

As shown in FIG. 5, at the time of release, the upper mold 20 is separated from the lower mold 30 and the core part 26 of the upper mold 20 is moved relative to the body part 28 in the direction of the optical axis. Accordingly, the edge portion 3 of the molded lens 1 is separated from the transfer surface of the body part 28. Subsequently, the lens 1 is separated from the transfer surface of the core part 26. It is possible to obtain the molded lens 1 in this way.

Figure 6:
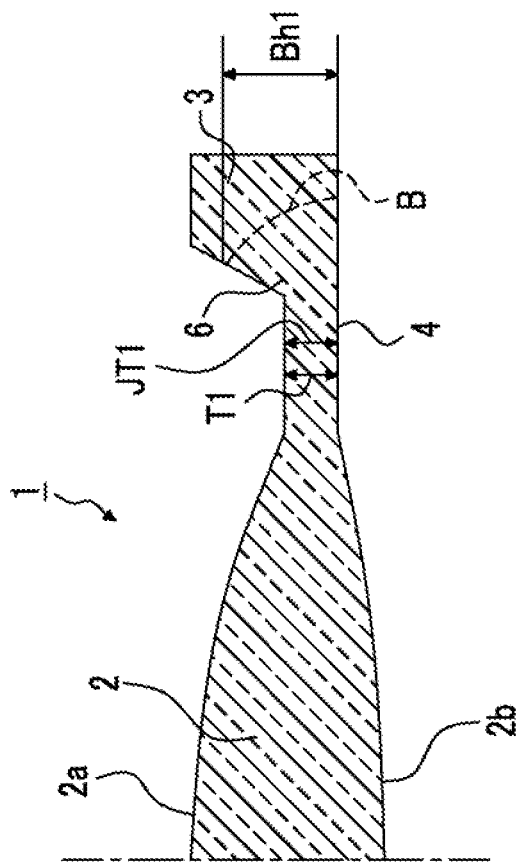
FIG. 6 is an enlarged partial cross-sectional view of a part of the lens.

According to the above-mentioned molding method, since the thickness Bh1 of the boundary surface B of the portion, which is extruded from the compression molded portion, in the direction of the optical axis is larger than the thickness JT1 of the thinnest portion of the connecting portion 4, as shown in FIG. 6, the area of the boundary surface between the compression molding material M1 and the injection molding material M2 can be made large. Accordingly, since it is possible to bond the first molded portion to the second molded portion with a high strength, the generation of defects, such as separation or damage, is suppressed. Therefore, it is possible to obtain the lens having excellent optical performance with high accuracy while taking advantages of the compression molding and the injection molding.

Next, the shape of the lens 1, which is obtained from the above-mentioned molding method, will be described.

FIG. 6 enlarges a part of the lens 1.

The lens 1 is a convex lens. When the thickness of the thinnest portion of the lens in the direction of the optical axis is denoted by T1, the thickness JT1 of the thinnest portion corresponding to the dimension of the connecting portion 4 in the direction of the optical axis is equal to the thickness T1 of the thinnest portion of the lens in the direction of the optical axis. Accordingly, the thickness T1 of the thinnest portion of the lens in the direction of the optical axis is included in the first molded portion.

At this time, when the thickness T1 of the thinnest portion of the lens in the direction of the optical axis is in the range of 0.1 mm to 1.0 mm, effects obtained from the compression molding and the injection molding are more significant. When T1 is in the range of 0.1 mm to 0.7 mm, the effects are much more significant. If the value of T1 is smaller than 0.1, cracks are generated when a molding is released from the mold. For this reason, a yield is reduced. In contrast, if T1 exceeds an upper limit, the lens has a thickness where the entire lens can also be molded by injection molding. Accordingly, advantages, which is obtained when the first molded portion is formed by compression molding, are reduced.

Figure 7:
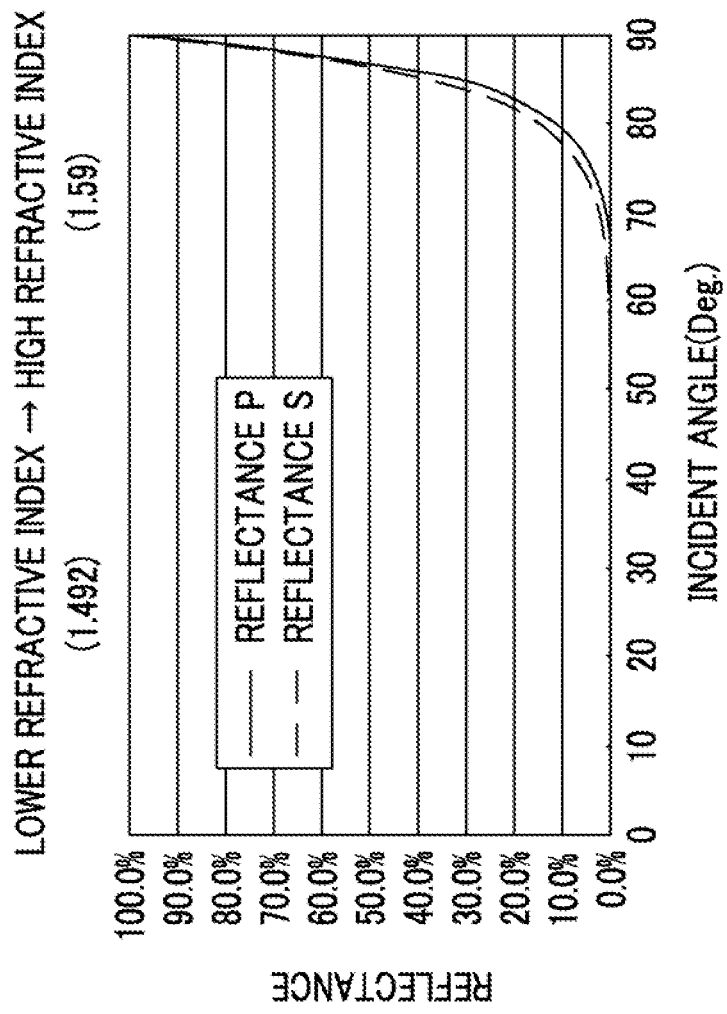
FIG. 7 is a graph showing a relationship between an incident angle and a reflection angle at a boundary surface when light travels to an edge portion having a high refractive index from an optical functional portion having a low refractive index.
Figure 8:
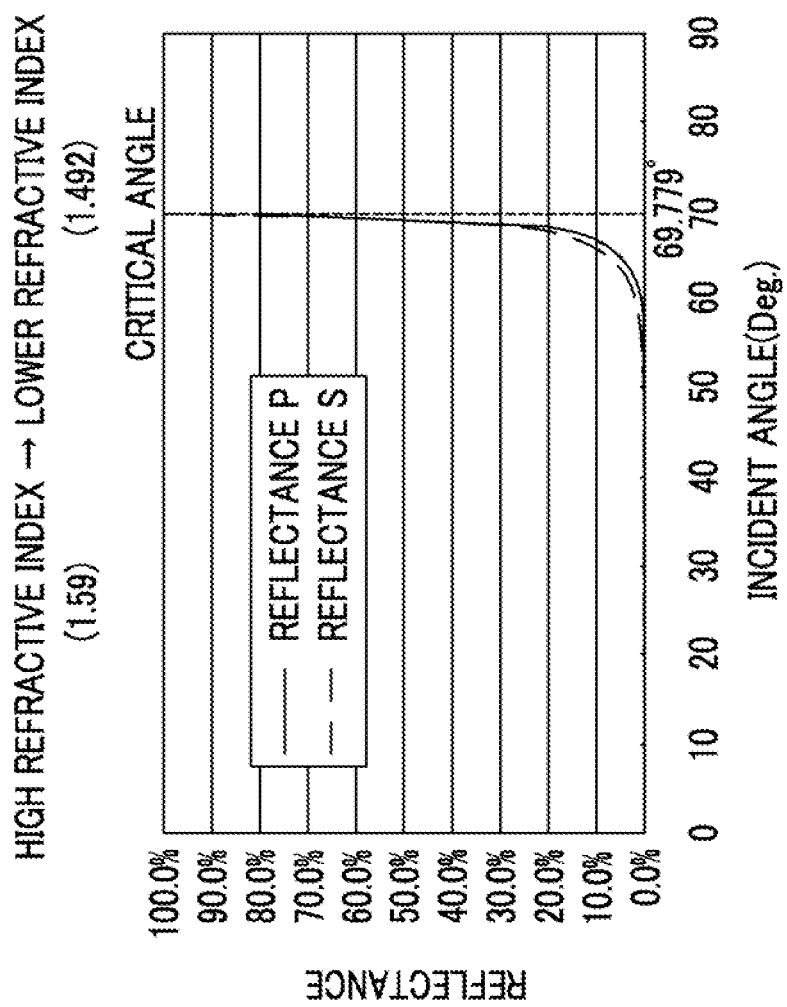
FIG. 8 is a graph showing a relationship between an incident angle and a reflection angle at the boundary surface when light travels to an optical functional portion having a low refractive index from an edge portion having a high refractive index.

Next, a relationship between an incident angle and reflectance at the boundary surface between the first and second molded portions will be described. FIG. 7 is a graph showing a relationship between an incident angle and reflectance at the boundary surface when light travels to the second molded portion having a high refractive index from the first molded portion having a low refractive index. FIG. 8 is a graph showing a relationship between an incident angle and reflectance at the boundary surface when light travels to the first molded portion having a low refractive index from the second molded portion having a high refractive index. Reflectance P means the reflectance of a component of polarized light P of incident light, and reflectance S means the reflectance of a component of polarized light S of incident light. Further, an incident angle means an incident angle of light with respect to a normal line of the boundary surface B according to Snell's law.

Here, a low refractive index is a refractive index of 1.492 corresponding to acryl, and a high refractive index is a refractive index of 1.59 corresponding to polycarbonate.

It is found that reflectance is increased in proportion to the increase of an incident angle when light travels to a region having a high refractive index from a region having a low refractive index as shown in FIG. 7. Meanwhile, when light travels to a region having a low refractive index from a region having a high refractive index as shown in FIG. 8, there exists a critical angle at which reflectance is suddenly increased to reach substantially 100% and light is totally reflected when an incident angle is equal to or larger than the critical angle.

For this reason, when the refractive index of the first molded portion is denoted by n1 and the refractive index of the second molded portion is denoted by n2, it is preferable that "$1<n1<n2$" be satisfied. When the refractive index of the second molded portion close to the edge portion is set to be high as described above, light, which travels to the edge portion 3 from the optical functional portion 2, is affected at the boundary surface B by the change of reflectance, which depends on an incident angle, but can be transmitted. Meanwhile, when light entering the edge portion 3 returns to the optical functional portion 2 after being affected at the edge portion 3 by internal reflection or diffusion, the light has a random incident angle with respect to the boundary surface B. At this time, if an incident angle with respect to the normal line of the boundary surface B according to Snell's law is equal to or larger than the critical angle, light is totally reflected. Accordingly, light, which returns to the first molded portion of the optical functional portion 2 from the second molded portion close to the edge portion, is limited. As a result, since the light, which returns to the optical functional portion 2 from the edge portion 3, is limited, an effect of reducing flare caused by internal reflection is obtained. This effect is effective as the refractive index of the edge portion 3 becomes higher than the refractive index of the optical functional portion 2. In contrast, when the refractive index n1 of the first molded portion is higher than the refractive index n2 of the second molded portion, the light traveling to the second molded portion from the first molded portion causes total reflection according to an incident angle with respect to the normal line of the boundary surface B and becomes stray light. For this reason, it is not preferable that the refractive index n1 be higher than the refractive index n2.

The injection molding material of the second molded portion requires light transmittance in order to limit the light that returns to the optical functional portion 2 from the edge portion 3 in this way, and it is also possible to attenuate the amount of return light, which has an incident angle equal to or smaller than the critical angle, by lowering light transmittance. It is preferable that the second molded portion have internal transmittance equal to or higher than 30% and lower than 100% per a thickness of 1 mm. If light transmittance exceeds a lower limit, the effect of the boundary surface B as a reflective surface is more significant than a light amount attenuating effect of the boundary surface B. For this reason, the possibility that flare is increased is increased.

Next, another shape of the lens of the invention will be described.

Figure 9:
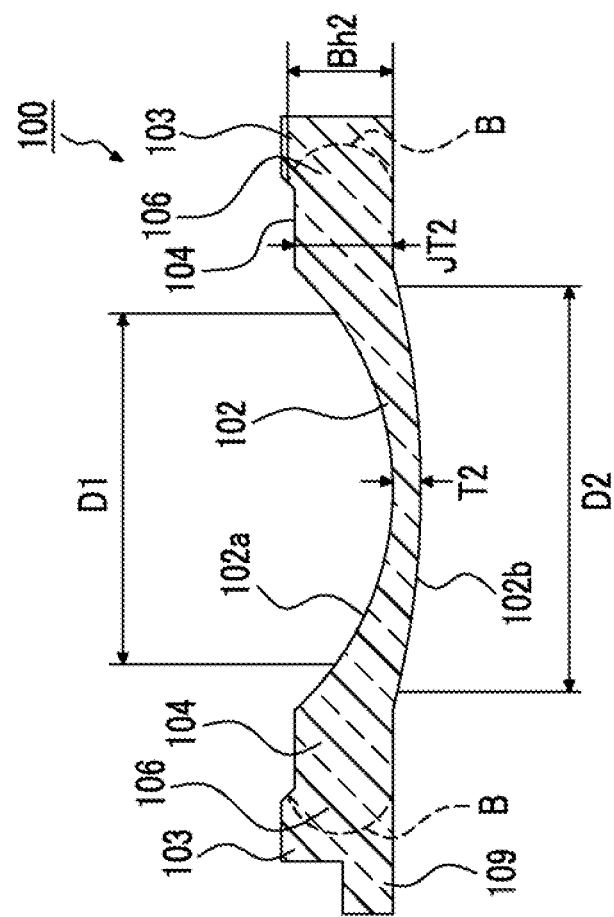
FIG. 9 is a cross-sectional view of a lens of the invention.

FIG. 9 shows an example of another shape of the lens of the invention. A lens 100 includes an optical functional portion 102, a connecting portion 104 that is integrally formed at the outer periphery of the optical functional portion 102, and an edge portion 103 that is integrally formed at the outer periphery of the connecting portion 104.

The optical functional portion 102 includes a pair of optical functional surfaces 102a and 102b on the front and rear surfaces thereof. The optical functional surface 102a is a concave surface, and the optical functional surface 102b is convex surface.

The connecting portion 104 is formed to have a thickness larger than the thickness of the optical functional portion 102. The connecting portion 104 is an annular portion that is formed so as to surround the optical functional portion 102 when seen in the direction of an optical axis.

The edge portion 103 has a stepped portion at an outer peripheral portion of the connecting portion 104, and the thickness of the edge portion 103 is larger than the thickness of the connecting portion 104 due to the stepped portion. The stepped portion is formed so that a stepped surface of the stepped portion is inclined with respect to the optical axis (for example, with respect to the optical axis by an angle of about 45°). The edge portion 103 is an annular portion that is formed so as to surround the optical functional portion 102 and the connecting portion 104 when seen in the direction of the optical axis.

The edge portion 103 is a portion that is directly fitted to a mating member when the lens 100 is assembled with a support frame and a lens barrel.

A gate residue 109 is formed on a part of the outer peripheral surface of the edge portion 103 of the lens 100. A molding material, which remains at a gate portion through which the molding material is injected, remains on the lens 100 in an injection molding step to be described below, so that the gate residue 109 is formed. The gate residue 109 is cut after molding. FIG. 9 shows a state in which the gate residue 109 is not yet cut from the lens 100.

The lens 100 is formed by a molding method that includes a compression molding step and an injection molding step. For this reason, the lens 100 includes a first molded portion that is made of a compression molding material and a second molded portion that is made of an injection molding material. Meanwhile, the compression molding material and the injection molding material are collectively referred to as a molding material in the following description. Both of the compression molding material and the injection molding material are thermoplastic resins in the following description.

A boundary surface between the first and second molded portions is represented by a dotted line B in FIG. 9, and is described as a boundary surface B. Meanwhile, the boundary surface B between the first and second molded portions is changed according to the conditions of compression molding and injection molding, and the shape or position of the boundary surface B may be changed without departing from the range in which the effect of the invention is obtained.

In the lens 100, an effective diameter of the optical functional surface 102a of the optical functional portion 102 is denoted by D1 and an effective diameter of the optical functional surface 102b of the optical functional portion 102 is denoted by D2.

The first molded portion includes the optical functional portion 102 and the effective diameters D1 and D2 of the pair of optical functional surfaces 102a and 102b of the optical functional portion 102, and the first molded portion is a portion that includes the connecting portion 104. The first molded portion includes a portion 106 that is formed closer to the outer periphery than the connecting portion 104 so as to be thicker than the connecting portion 104 and spreads in the direction of the optical axis. This portion 106 is referred to as an expansion portion 106. The expansion portion 106 forms a part of the edge portion 103.

The second molded portion corresponds to a portion of the lens 100 that is closer to the outer periphery than the boundary surface B, and is a portion that forms at least a part of the edge portion 103.

The lens 100 has a shape in which the central portion of the optical functional portion 102 is thinnest.

Since the expansion portion 106 is included in the first molded portion, which is formed by compression molding, of the lens 100, the generation of a small gap at the boundary surface B between the first and second molded portions is suppressed and the generation of defects, such as separation or damage of the boundary surface B, is suppressed.

Next, a mold for molding the lens 100 shown in FIG. 9 will be described.

Figure 10:
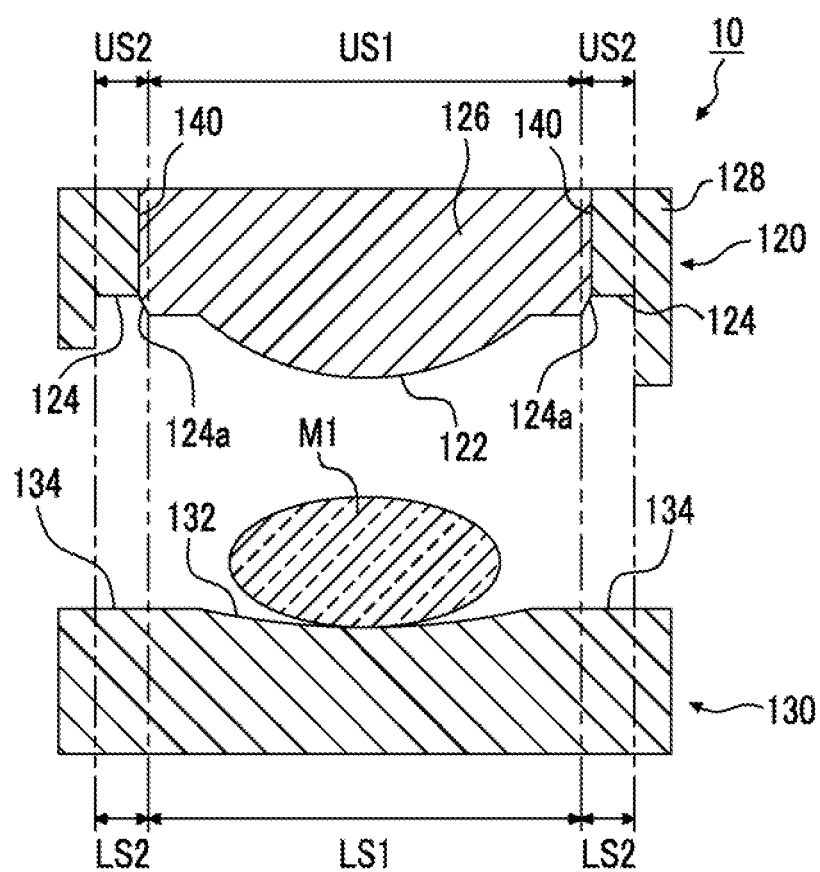
FIG. 10 is a schematic cross-sectional view showing a mold for molding the lens of the FIG. 9.

FIG. 10 shows the schematic cross-section of the mold for molding the lens of FIG. 9. The mold 10 includes an upper mold 120 that is a first mold and a lower mold 130 that is a second mold. Hereinafter, the first mold and the second mold are referred to as the upper mold 120 and the lower mold 130, respectively. FIG. 10 shows a state in which a compression molding material M1 is placed on the lower mold 130.

The upper mold 120 includes a columnar core part 126 and a substantially cylindrical body part 128 into which the core part 126 is relatively movably inserted and which is relatively movably fitted to the core part 126. During molding, the core part 126 and the body part 128 of the upper mold 120 are fixed to each other and cannot be moved relative to each other.

A transfer surface, which transfers a predetermined lens shape to the molding material, is formed on the lower end face of the upper mold 120. Further, a transfer surface, which transfers a predetermined lens shape to the molding material, is formed on an end face of the lower mold 130 facing the upper mold.

The transfer surface of the upper mold 120 includes a first transfer surface 122 that corresponds to the surface of a range indicated by an arrow US1, and a first outer peripheral transfer surface 124 that corresponds to the surface of a range indicated by an arrow US2. Likewise, the transfer surface of the lower mold 130 includes a second transfer surface 132 that corresponds to the surface of a range indicated by an arrow LS1, and a second outer peripheral transfer surface 134 that corresponds to the surface of a range indicated by an arrow LS2.

The first transfer surface 122 of the upper mold 120 includes a convex surface, and the convex surface has an inverted shape of the shape of the optical functional surface 102a of the lens 100. A flat surface, which transfers the shape of the connecting portion 104, is formed at the outer periphery of the convex surface of the first transfer surface 122. The flat surface is substantially perpendicular to the optical axis of the lens 100 to be molded.

The first outer peripheral transfer surface 124 includes a stepped portion 124a that continues to the first transfer surface 122. The stepped portion 124a is formed so as to be inclined with respect to the optical axis (for example, with respect to the optical axis by an angle of about 45°). The first outer peripheral transfer surface 124 has an inverted shape of the shape of the edge portion 103 of the lens 100. In a plan view of the transfer surface of the upper mold 120, the first transfer surface 122 has a substantially perfect circular shape and the first outer peripheral transfer surface 124 is formed in an annular shape so as to surround the first transfer surface 122.

The second transfer surface 132 of the lower mold 130 includes a concave surface, and the concave surface has an inverted shape of the shape of the optical functional surface 102b of the lens 100. A flat surface, which transfers the shape of the connecting portion 104, is formed at the outer periphery of the concave surface of the second transfer surface 132.

The second outer peripheral transfer surface 134 is a flat surface that continues to the flat surface of the second transfer surface 132. The flat surfaces of the second transfer surface 132 and the second outer peripheral transfer surface 134 are substantially perpendicular to the direction of the optical axis of the lens 100 to be molded.

Next, a method of molding the lens will be described. A procedure for molding the lens 100, which is shown in FIG. 9, by using the mold 10 shown in FIG. 10 will be described below.

FIG. 11 shows the states of the compression molding and the injection molding of the lens.

Figure 11A:
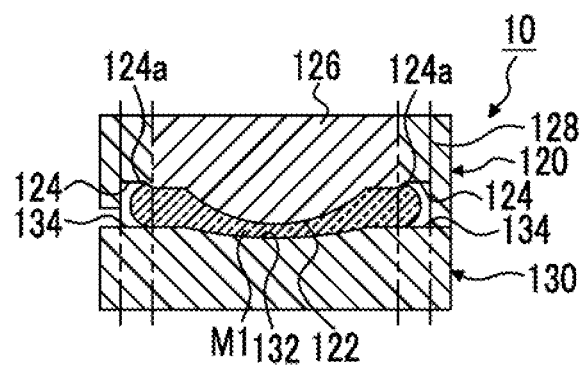
FIG. 11A, FIG. 11B, and FIG. 11C are cross-sectional views showing a state in which compression molding and injection molding are performed in the mold of FIG. 10 when the lens is molded.

In the compression molding step, first, the lower and upper molds 130 and 120 are moved relative to each other so as to approach each other as shown in FIG. 11A. Further, the compression molding material M1 is compressed between the first and second transfer surfaces 122 and 132. The shapes of the pair of optical functional surfaces 102a and 102b are transferred to the compression molding material M1.

Subsequently, when the lower and upper molds 130 and 120 further approach each other, the compression molding material M1 is pushed and expanded and a part of the compression molding material M1 enters a gap between the first and second outer peripheral transfer surfaces 124 and 134. When the lower and upper molds 130 and 120 further approach each other in a direction where the molds are closed, a portion of the compression molding material M1, which is extruded into an outer peripheral transfer cavity partitioned between the first and second outer peripheral transfer surfaces 124 and 134, is released from compression pressure. Accordingly, the extruded portion of the compression molding material expands in the gap, and remains so that the thickness of the extruded portion is not changed between the first and second transfer surfaces 122 and 132 even though the lower and upper molds approach each other in a direction in which the mold is closed. Meanwhile, the thickness of the connecting portion in the direction of the optical axis is reduced by an operation for closing the mold. As a result, the thickness of the portion, which is extruded into the outer peripheral transfer cavity, in the direction of the optical axis becomes larger than the thickness of the connecting portion in the direction of the optical axis. The portion, which is extruded into the gap between the first and second outer peripheral transfer surfaces 124 and 134, corresponds to a portion that forms the expansion portion 106 of the lens 100 to be molded. Meanwhile, the shape of the expansion portion 106 is changed according to the amount of compression, compression speed, and the volume of the compression molding material M1 to be supplied in the compression molding step. The lower and upper molds 130 and 120 are closed in this way, so that the compression molding step is completed.

Subsequently, the injection molding step is performed.

Figure 11B:
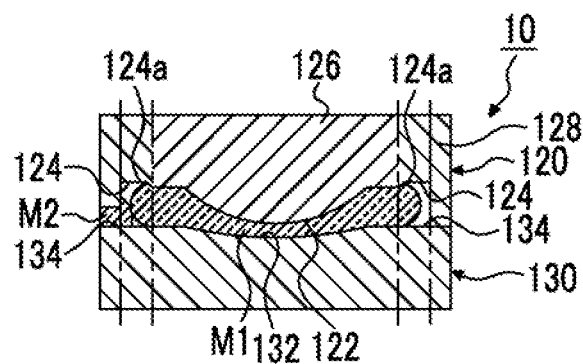

As shown in FIG. 11B, the injection molding step is performed in a state in which the lower and upper molds 130 and 120 are closed. An injection molding material M2 is injected into the outer peripheral transfer cavity, which is partitioned between the first and second outer peripheral transfer surfaces 124 and 134, from an injection gate of the mold 10. The outer peripheral transfer cavity is formed in an annular shape so as to surround the outer periphery of the compressed compression molding material M1. The injection molding material M2 is injected before the compression molding material M1 reaches a temperature equal to or lower than a glass transition temperature after the molds are closed in the compression molding step.

Figure 11C:
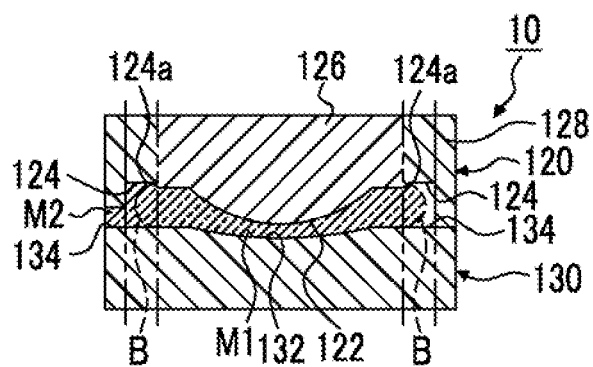

As shown in FIG. 11C, the injected injection molding material M2 is spread to the outer periphery of the compression molding material M1 through the outer peripheral transfer cavity, and is bonded to the compression molding material M1. At this time, the compression molding material M1 and the injection molding material M2 are firmly bonded to each other at the boundary surface therebetween by a compressive force applied to the compression molding material M1 and an injection force of the injection molding material M2.

As the injection molding material M2 is injected, gas, such as air present in the outer peripheral transfer cavity or gas generated from the resin, is discharged to the outside of the mold through a mold parting groove 140 (gas vent groove) that is formed at the boundary between the first transfer surface 122 and the stepped portion 124a continuing to the first transfer surface 122. Further, since the outer peripheral portion of the compression molded portion is extruded into the outer peripheral transfer cavity, the confinement of gas near the boundary surface between the first and second molded portions is prevented. If gas remains in a lens mold, there is a possibility that the shape of the lens becomes non-uniform, moldability deteriorates, and the deterioration of the glossiness of the surface of the lens is caused by gas burning at the time of molding. Accordingly, from these viewpoints, it is preferable that the gas vent hole or the gas vent groove be formed at an outer peripheral transfer cavity portion. Further, since it is possible to remove gas from a gas vent hole or a gas vent groove by forming the gas vent hole or the gas vent groove, it is possible to prevent the backflow of a resin that is caused by an excessive pressure rise in the lens mold, as a subsidiary effect. Furthermore, since the gas vent hole or the gas vent groove is formed, excessive adherence between the molded lens and the lens mold is prevented and it is easy to separate the molded lens from the lens mold, as a subsidiary effect.

Alternatively, instead of the above-mentioned gas vent hole or gas vent groove, a gap between the core part and the body part of the lens mold may be also formed of a structure corresponding to the gas vent hole or the gas vent groove. When the gap between the core part and the body part of the lens mold may be also formed of a structure corresponding to the gas vent hole or the gas vent groove, it is possible to remove gas without forming a new structure, such as a hole or a groove, in the lens mold and to further simplify the structure of the lens mold. From the viewpoint of the low manufacturing cost of the lens mold, it is preferable that the structure of the lens mold be simplified.

After the injection molding, cooling is performed while the molds of the mold 10 are closed so that the compression molding material M1 and the injection molding material M2 are sufficiently hardened. At the time of release, the upper mold 120 is separated from the lower mold 130 and the core part 126 of the upper mold 120 is moved relative to the body part 128 in the direction of the optical axis. Accordingly, the edge portion 103 of the molded lens 100 is separated from the transfer surface of the body part 128. Subsequently, the lens 100 is separated from the transfer surface of the core part 126. It is possible to obtain the molded lens 100 in this way.

According to the above-mentioned molding method, since the height Bh2 of the boundary surface B between the compression molding material M1 of the first molded portion and the injection molding material M2 of the second molded portion is larger than the thickness JT2 of the thinnest portion of the connecting portion 104 in the direction of the optical axis, the contact area is increased. Accordingly, since it is possible to improve strength at the boundary surface, the generation of defects, such as separation or damage, is suppressed. Therefore, it is possible to obtain the lens having excellent optical performance with high accuracy while taking advantages of the compression molding and the injection molding.

Next, the shape of the lens 100, which is obtained from the above-mentioned molding method, will be described.

Figure 12:
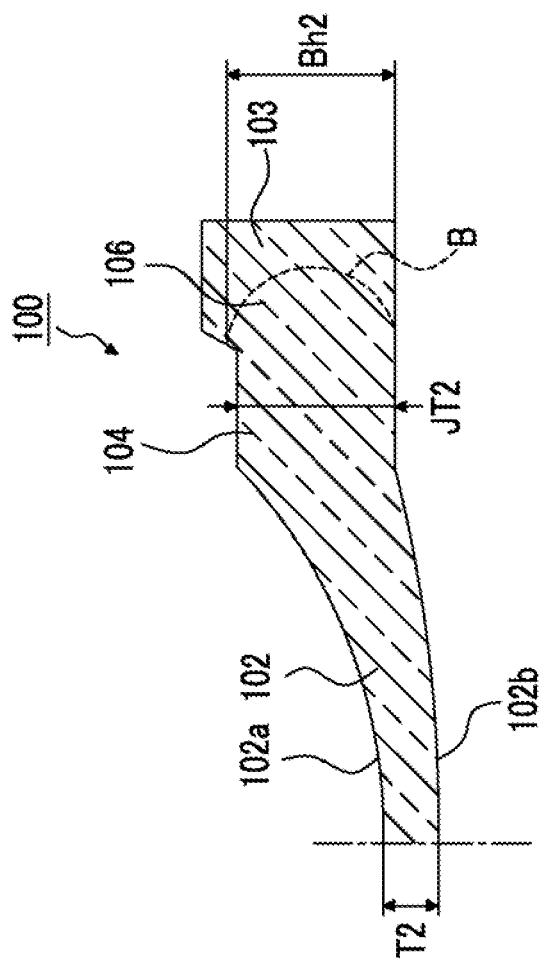
FIG. 12 is an enlarged partial cross-sectional view of a part of the lens.

FIG. 12 enlarges a part of the lens 100.

The lens 100 is a concave lens. Since the thickness T2 of the thinnest portion of the lens in the direction of the optical axis is the center thickness of the lens on the optical axis, T2 is included in the first molded portion. At this time, when the thickness T2 of the thinnest portion is in the range of 0.1 mm to 1 mm, effects obtained from the compression molding and the injection molding are more significant. When T2 is in the range of 0.1 mm to 0.7 mm, the effects are much more significant. If T2 is smaller than a lower limit, cracks are likely to be generated when a molding is released from the mold. For this reason, a yield is reduced. In contrast, if T2 exceeds an upper limit, the lens has a thickness where the entire lens can also be molded by injection molding. Accordingly, a merit, which is obtained when the first molded portion is formed by compression molding, is reduced.

The shape of the optical functional portion of the lens of the invention may be appropriately modified. One or both of the pair of the optical functional surfaces of the optical functional portion may be concave surfaces, and one or both of the pair of the optical functional surfaces may be convex surfaces.

Figure 13:
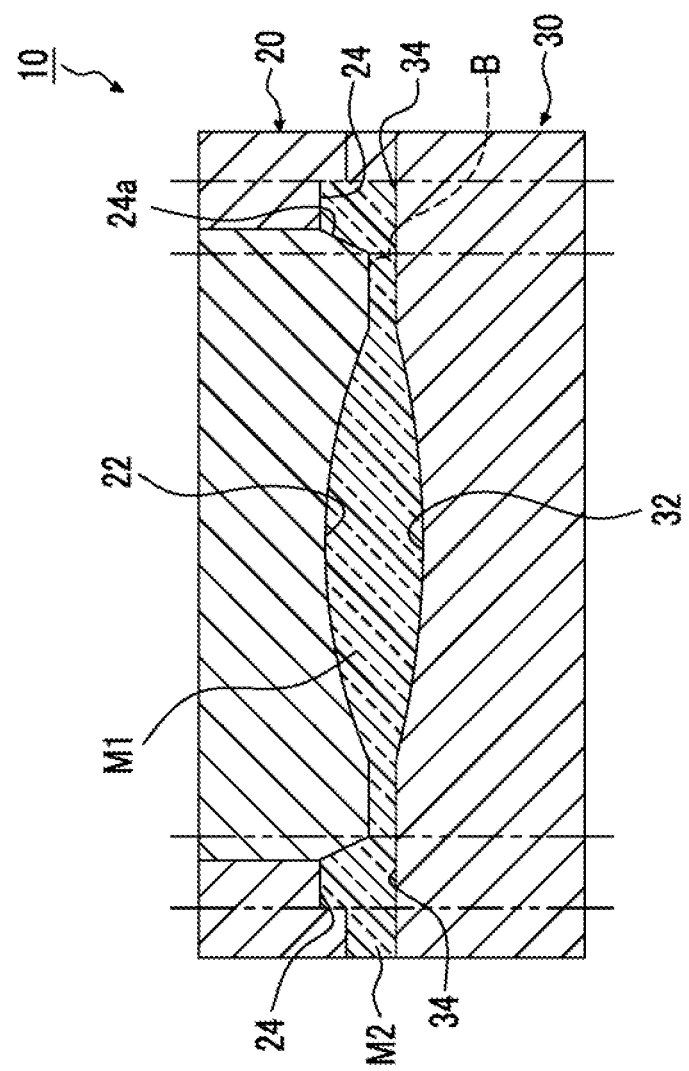
FIG. 13 is a view showing an example illustrating an effect of a molding method of the invention through comparison.
Figure 14:
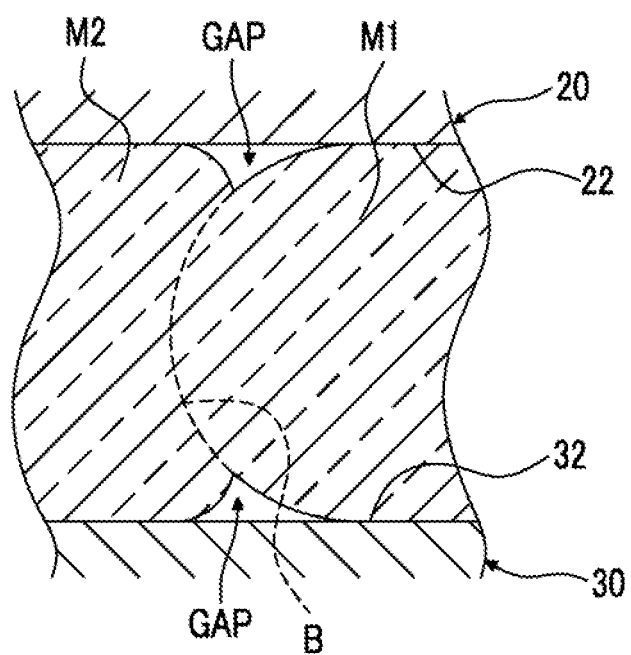
FIG. 14 is an enlarged view of a main part of FIG. 13.

Next, the effect of the molding method of the invention will be described using a structural example to be compared. FIG. 13 is a view showing a structural example illustrating the effect of the molding method of the invention through comparison. FIG. 14 is an enlarged view of a main part including a boundary surface of FIG. 13.

When a boundary surface B between a compression molding material M1 and an injection molding material M2 is present between first and second transfer surfaces 22 and 32, gaps are formed between a resin and a mold at the boundary surface B. Since spaces formed by the compressed compression molding material M1 and the first and second transfer surfaces 22 and 32 are small when the injection molding material M2 is injected after compression molding, the small spaces are not sufficiently filled with the injection molding material M2 and the bonding between the injection molding material M2 and the compression molding material M1 is hindered. For this reason, the gaps are formed. Since these gaps cause defects, such as separation or damage of the boundary surface of the molded lens 100, adhesion deteriorates.

In the invention, since the height of the boundary surface B between the compression molding material M1 of the first molded portion and the injection molding material M2 of the second molded portion is larger than the thickness of the thinnest portion of the connecting portion in the direction of the optical axis, the contact area between the compression molding material M1 of the first molded portion and the injection molding material M2 of the second molded portion is increased. Accordingly, it is possible to improve the bonding strength at the boundary surface. In addition, the boundary surface B between the compression molding material M1 and the injection molding material M2 is positioned outside the compression molded portion between the first and second transfer surfaces 22 and 32 in the outer peripheral transfer cavity of the injection molding step. For this reason, small spaces are not formed at contact portions between the compression molding material M1 and each of the first and second transfer surfaces 22 and 32. Further, since a portion of the compression molding material M1 outside the compression molded portion does not receive a compressive force, the portion of the compression molding material M1 outside the compression molded portion is formed so as to swell out from the central portion of the lens to the outside in the radial direction. Further, the injection molding material M2 is firmly bonded to the compressed compression molding material M1. Accordingly, it is possible to obtain high-strength bonding, and to obtain a lens that is molded with high accuracy.

Here, an example of the molding of the lens having both convex surfaces shown in FIG. 1 has been described, but the same effects can also be obtained from the lens having an upper concave surface shown in FIG. 9 or the molding thereof.

This specification discloses the following matters.

(1) A lens that has an optical axis and includes a pair of optical functional surfaces on front and rear surfaces thereof, the lens including:

an optical functional portion that includes the pair of optical functional surfaces;

an edge portion that is provided at an outer periphery of the optical functional portion; and a connecting portion that is provided between the optical functional portion and the edge portion, connects the optical functional portion with the edge portion, and is thinner than the edge portion in a direction of the optical axis, wherein the optical functional portion, the edge portion, and the connecting portion form a first molded portion that is formed by compression molding and includes the optical functional portion, the connecting portion, and a part of the edge portion, and a second molded portion that is formed by injection molding and forms the rest of the edge portion, and the thickness of a boundary surface between the first and second molded portions in the direction of the optical axis is larger than the thickness of the thinnest portion of the connecting portion in the direction of the optical axis.

(2) The lens according to (1), wherein when the dimension of the lens in the direction of the optical axis is the thickness of the lens, the thinnest portion of the lens is included in the first molded portion.

(3) The lens according to (2),
wherein when the dimension of the lens in the direction of the optical axis is thickness, the thickness of the thinnest portion is in the range of 0.1 mm to 1.0 mm.

(4) The lens according to any one of (1) to (3),
wherein when a refractive index of the first molded portion is denoted by n1 and a refractive index of the second molded portion is denoted by n2, "1<n1<n2" is satisfied.

(5) The lens according to any one of (1) to (4),
wherein the second molded portion is made of a material that has an internal transmittance of 30% or more per a thickness of 1 mm.

(6) The lens according to any one of (1) to (5),
wherein one or both of the pair of optical functional surfaces are concave surfaces.

(7) The lens according to any one of (1) to (5),
wherein one or both of the pair of optical functional surfaces are convex surfaces.

(8) A method of molding a lens, which includes a pair of optical functional surfaces on front and rear surfaces thereof, by a mold, the mold including a first mold that includes a first transfer surface for transferring one of the pair of optical functional surfaces and a first outer peripheral transfer surface formed around the first transfer surface and a second mold that includes a second transfer surface for transferring the other of the pair of optical functional surfaces and a second outer peripheral transfer surface formed around the second transfer surface, the method including:

a compression molding step of placing a compression molding material on the second transfer surface, and forming the pair of optical functional surfaces on the compression molding material by compressing the compression molding material between the first and second transfer surfaces while closing the molds by moving the first and second molds relative to each other so that the first and second molds approach each other; and an injection molding step of forming outer peripheral portions of the pair of optical functional surfaces with an injection molding material by injecting the injection molding material into an outer peripheral transfer cavity partitioned between the first and second outer peripheral transfer surfaces when the molds are closed, wherein the outer peripheral transfer cavity is filled with the injection molding material in the injection molding step when at least a part of the compression molding material is extruded into the outer peripheral transfer cavity by a compressive force.

(9) The method of molding a lens according to (8),
wherein when the dimension of the lens in a direction of an optical axis is the thickness of the lens, the thinnest portion of the lens is molded between the first and second transfer surfaces in the compression molding step.

(10) The method of molding a lens according to (8) or (9),
wherein the compression molding material is a thermoplastic resin.

(11) A lens mold for molding the lens according to (1), the mold including:
a gas vent hole or a gas vent groove that is formed at an outer peripheral transfer cavity portion.

(12) The lens mold according to (11),
wherein the gas vent groove formed at the outer peripheral transfer cavity portion is a gap between a core part and a body part of the lens mold.

What is claimed is:

1. A lens that has an optical axis and includes a pair of optical functional surfaces on front and rear surfaces thereof, the lens comprising:

an optical functional portion that includes the pair of optical functional surfaces;

an edge portion that is provided at an outer periphery of the optical functional portion; and a connecting portion that is provided between the optical functional portion and the edge portion, connects the optical functional portion with the edge portion, and is thinner than the edge portion in a direction of the optical axis, wherein the optical functional portion, the edge portion, and the connecting portion form a first molded portion that is formed by compression molding and includes the optical functional portion, the connecting portion, and a part of the edge portion, and a second molded portion that is formed by injection molding and forms the rest of the edge portion, and the thickness of a boundary surface between the first and second molded portions in the direction of the optical axis is larger than the thickness of the thinnest portion of the connecting portion in the direction of the optical axis, wherein a refractive index of the first molded portion, denoted by n1, and a refractive index of the second molded portion, denoted by n2, satisfy "1<n1<n2".

2. The lens according to claim 1,
wherein the second molded portion is made of a material that has an internal transmittance of 30% or more per a thickness of 1 mm.

3. The lens according to claim 1,
wherein one or both of the pair of optical functional surfaces are concave surfaces.

4. The lens according to claim 1,
wherein one or both of the pair of optical functional surfaces are convex surfaces.

5. A lens mold for molding the lens according to claim 1, the mold comprising:
a gas vent hole or a gas vent groove that is formed at an outer peripheral transfer cavity portion.

6. The lens mold according to claim 5,
wherein the gas vent groove or the gas vent groove is a gap between a core part and a body part of the lens mold.

7. The lens according to claim 1,
wherein when the dimension of the lens in the direction of the optical axis is the thickness of the lens, the thickness of the thinnest portion of the lens is included in the first molded portion.

8. The lens according to claim 7,
wherein one or both of the pair of optical functional surfaces are convex surfaces.

9. The lens according to claim 7,
wherein one or both of the pair of optical functional surfaces are concave surfaces.

10. The lens according to claim 7,
wherein the second molded portion is made of a material that has an internal transmittance of 30% or more per a thickness of 1 mm.

11. The lens according to claim 7,
wherein the thickness of the thinnest portion is in the range of 0.1 mm to 1.0 mm.

12. The lens according to claim 11,
wherein one or both of the pair of optical functional surfaces are convex surfaces.

13. The lens according to claim 11,
wherein one or both of the pair of optical functional surfaces are concave surfaces.

14. The lens according to claim 11,
wherein the second molded portion is made of a material that has an internal transmittance of 30% or more per a thickness of 1 mm.

15. A method of molding a lens according to claim 1, which includes a pair of optical functional surfaces on front and rear surfaces thereof, by a mold, the mold including a first mold that includes a first transfer surface for transferring one of the pair of optical functional surfaces and a first outer peripheral transfer surface formed around the first transfer surface and a second mold that includes a second transfer surface for transferring the other of the pair of optical functional surfaces and a second outer peripheral transfer surface formed around the second transfer surface, the method comprising:

a compression molding step of placing a compression molding material having a refractive index, n1, greater than 1 on the second transfer surface, and forming the pair of optical functional surfaces on the compression molding material by compressing the compression molding material between the first and second transfer surfaces while closing the molds by moving the first and second molds relative to each other so that the first and second molds approach each other; and an injection molding step of forming outer peripheral portions of the pair of optical functional surfaces with an injection molding material by injecting the injection molding material having a refractive index, n2, higher than the refractive index, n1, of the molding material into an outer peripheral transfer cavity partitioned between the first and second outer peripheral transfer surfaces when the molds are closed, wherein the outer peripheral transfer cavity is filled with the injection molding material in the injection molding step when at least a part of the compression molding material is extruded into the outer peripheral transfer cavity by the compression molding step.

16. The method of molding a lens according to claim 15,
wherein when the dimension of the lens in a direction of an optical axis is the thickness of the lens, the thinnest portion of the lens is molded between the first and second transfer surfaces in the compression molding step.

17. The method of molding a lens according to claim 15,
wherein the compression molding material is a thermoplastic resin.

* * * * *